United States Patent [19]
Panico

[11] 3,782,889
[45] Jan. 1, 1974

[54] APPARATUS FOR RAPID CURING OF RESINOUS MATERIALS

[75] Inventor: C. Richard Panico, Medford, Mass.

[73] Assignee: Xenon Corporation, Medford, Mass.

[22] Filed: Sept. 9, 1971

[21] Appl. No.: 178,936

[52] U.S. Cl. ............................................... 432/59
[51] Int. Cl. ............................................ F27b 9/28
[58] Field of Search ............... 263/3; 34/23, 24; 432/8, 59

[56] References Cited
UNITED STATES PATENTS

| | | | |
|---|---|---|---|
| 3,635,454 | 1/1972 | Angelo | 263/3 |
| 2,236,397 | 3/1941 | Drummond | 34/4 |

FOREIGN PATENTS OR APPLICATIONS

| | | | |
|---|---|---|---|
| 1,082,452 | 9/1967 | Great Britain | 263/3 |

Primary Examiner—John J. Camby
Attorney—Thomas N. Tarrant

[57] ABSTRACT

Apparatus providing in sequence a heat source for directing a flow of air under pressure at a temperature in the range of 250° to 800°C, a blower to direct a flow of cool air and a drive mechanism to produce motion between the heat source and blower relative to a resinous material to be cured at a speed whereby the material reaches a temperature of at least 170°C within a time interval of less than one minute and is then cooled.

9 Claims, 1 Drawing Figure

PATENTED JAN 1 1974
3,782,889
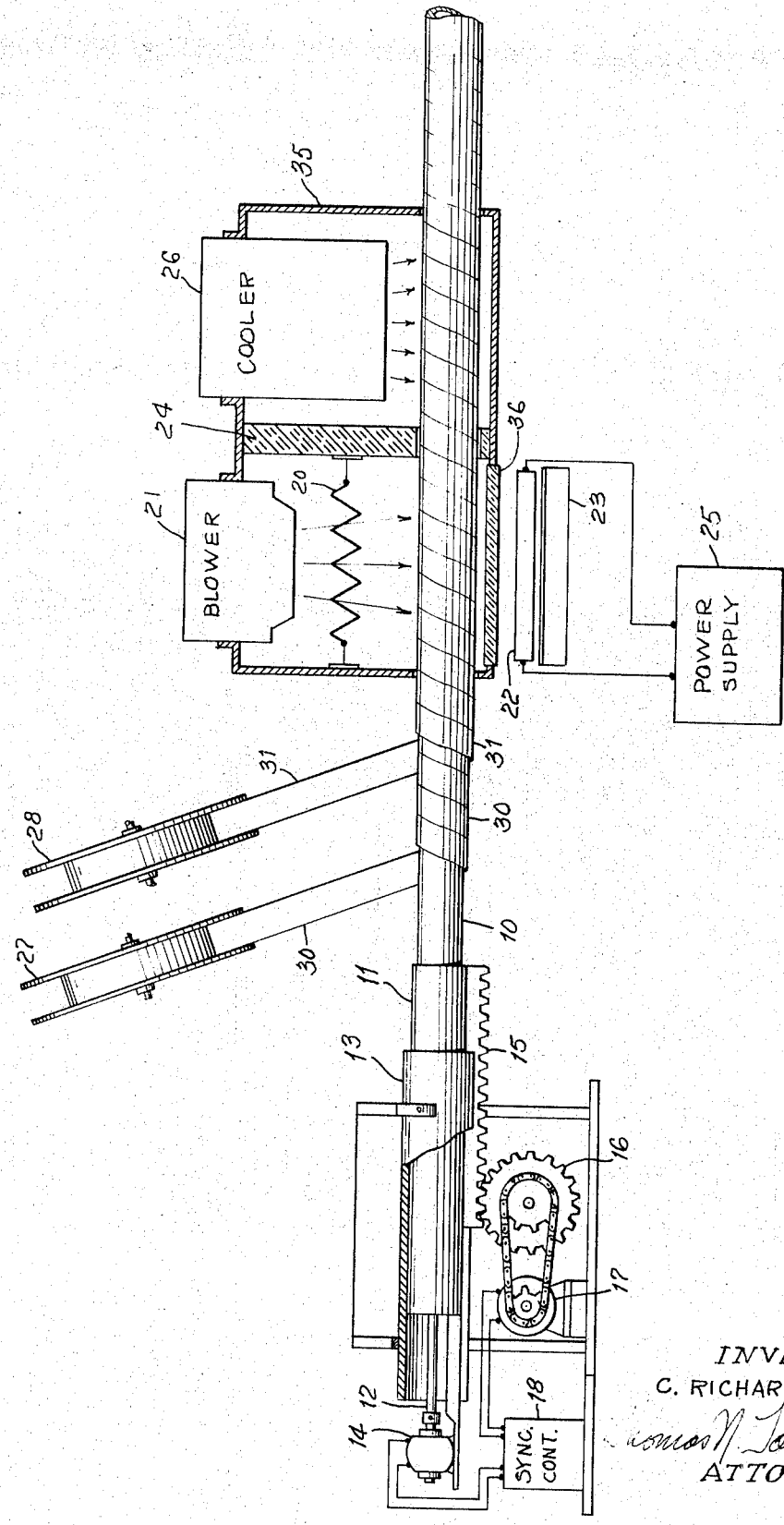
INVENTOR.
C. RICHARD PANICO
ATTORNEY

APPARATUS FOR RAPID CURING OF RESINOUS MATERIALS

BACKGROUND OF THE INVENTION

1. Field of the Invention

The present invention relates to rapid curing of resinous materials by application of heat.

2. Description of the Prior Art

The apparatus, according to the present invention, has the purpose of curing plastic or resinous materials. Curing, as used herein, is the processing of a plastic or resinous material from a fluid or soft and compliant state to a permanent hard, solid and durable state. Conventionally this is accomplished both by the elimination of solvents and by chemical changes involving interlinking of molecules commonly known as polymerization. Polymerization is the more advantageous since it does not commonly involve dimensional changes and usually produces a substantial increase in the strength of the material. Polymerization is usually caused by the addition of activating chemicals, by irradiation with some form of wave energy either electric or electromagnetic in nature and/or by heat. One of the greater problems in polymerization is the time involved. For example, in polymerizing by the use of heat, the speed is determined largely by the intensity of the heat applied. However, it has been found that the application of high heat usually results either in the formation of inferior polymers having less complex molecules, lower density and being weak and relatively fragile, or in the complete destruction of the material. The application of low heat and different forms of wave energy results in a delayed curing process. The use of chemical activators can increase speed but is extremely inconvenient under some conditions.

A large number of plastic materials today are made up of glass fibers or similar high durable material which is impregnated with a liquid resin followed by curing of the resin. The fibrous material and the resin are usually applied to a form before curing to obtain a desired shape. Recently, preimpregnated materials have become popular consisting of a web, usually of fiberglass, in which an uncured resinous material has been impregnated. The preimpregnated material is placed or wrapped upon or about a form or die and then cured to a hard and durable state. One application for such material that has excited some interest is in the forming and laying of pipe lines. A truck for laying the pipe lines would not have to carry lengths of pipe but merely rolls of the preimpregnated material which would be wrapped in a continuous process about a mandrel, cured and moved along and off the mandrel and into a trench or other location where the pipe line is desired. Any application of this sort necessarily requires high curing speeds.

In Van Nostrand's Scientific Encyclopedia, fourth edition at pages 130 and 131 the difficulties of rapid polymerization by heat are discussed. The cross-linking process in polymerization tends to terminate in a relatively simple, low weight molecule giving a weak and fragile quality to the polymer when high heat is used. Thus a maximum temperature of 150°C is recommended. In experimentation, the application of higher temperature causes a visible emission suggesting destruction or disassociation in the forming polymer. This emission had discouraged further testing in this direction.

SUMMARY OF THE INVENTION

In accordance with the present invention, it has been found that apparatus comprising means for delivering a rapid flow of highly heated air to a web of material preimpregnated with a polymerizeable resin so as to raise the temperature of the resin to at least 170°C in a time interval of less than one minute and further comprises means to produce relative motion between said preimpregnated material and said means for delivering a flow of highly heated air whereby said preimpregnated material will be removed from contact with said highly heated air within said time interval of less than one minute.

Thus it is an object of the invention to provide apparatus for high speed curing of polymerizable resins impregnated in a fibrous web.

It is a further object of the invention to provide apparatus for continuously forming a shaped product from fibrous material preimpregnated with polymerizeable resins and curing said resins simultaneously with said forming.

It is still a further object of the invention to provide apparatus for continuous curing of polymerizeable materials in which said materials move through the curing stages through a time interval of less than two minutes. Still a further object of the invention is to provide apparatus for combined heat and electromagnetic radiation for curing polymerizeable materials at a high rate of speed.

Further objects and features of the invention will become apparent upon reading the following description together with the drawing.

BRIEF DESCRIPTION OF THE DRAWING

A diagramatic illustration of apparatus for manufacturing pipe out of a web of fibrous material preimpregnated with polymerizeable resins in accordance with the invention.

DESCRIPTION OF A PREFERRED EMBODIMENT

In accordance with one aspect of the invention, a continuously cured and rigid pipe can be made in a practical manner at speeds up to at least 20 feet per minute. Since the speed in feet per minute is determined largely by the length of apparatus (the processing path) the limitation on speed is the practical length of processing apparatus.

The apparatus as depicted comprises: mandrel 10 extending from support sleeve 11. Shaft 12 driven by motor 14 extends through support sleeve 11 to rotate mandrel 10. Support sleeve 11 is mounted in a further sleeve 13. Support sleeve 11 further carries a toothed rack 15 activated by spur gear 16 driven by second motor 17. Spur gear 16 and motor 17 are operative to drive mandrel 10 in a reciprocating back and forth motion. Motors 14 and 17 are controlled by synchronizer control 18 to correlate the reciprocation of mandrel 10 with its rotation as required.

Heating element 20, depicted as an electrical resistive heating element, is positioned adjacent to mandrel 10 and a blower 21 is positioned on the opposite side of heating element 20 from mandrel 10 so as to drive air past heating element 20 and against mandrel 10.

Similarly positioned adjacent to mandrel 10 is a high intensity ultraviolet lamp 22 having a reflector 23 to direct the ultraviolet radiation from the lamp in the direction of mandrel 10. Ultraviolet lamp 22 is suitably of the intermittent arc (flash) type driven by a power supply 25. Cooling unit 26 is positioned adjacent to mandrel 10 following heating element 20 to provide a flow of cooling air. Cooling unit 26 as used, provided a flow of ambient air for cooling. However, the purpose is to bring a sharp halt to the temperature rise of the polymerizeable resin and refrigeration should be used when necessary for this purpose.

Housing 35 encloses heating element 20, blower 21 and cooling unit 26 in order to improve the efficiency of operation. Insulating partition 24 separates cooling unit 26 from heating element 20 to reduce overlap. Window 36 in housing 35 facing lamp 22 admits the ultraviolet light. Window 36 is desirably of quartz or other transparent material highly transparent to UV and resistant to heat.

A plurality of reels depicted by reel 27 and reel 28 are supported adjacent to mandrel 10 for feeding webs of fiberglass or similar fibrous material preimpregnated with polymerizeable resins to mandrel 10. Thus, as depicted, webs 30 and 31 are fed from reels 27 and 28 respectively for wrapping around mandrel 10.

In operation mandrel 10 is retracted by operation of motor 17 and gear 16 until gear 16 arrives at the end of rack 15 adjacent to mandrel 10. Webs 30 and 31 are attached to mandrel 10, for example, by masking tape. Heating element 20, blower 21 and cooling unit 26 and ultraviolet lamp 22 are all activated as is drive motor 14. Rotation of drive motor 14 rotates shaft 12 which in the first part of its rotation expands mandrel 10 and then in continuing rotates mandrel 10 so that webs 30 and 31 commence winding onto mandrel 10. At the commencement of rotation of mandrel 10, motor 17 under control of synchronizer control 18 begins a slow advancement of sleeve 11 carrying with it mandrel 10 and the webs 30 and 31 wound on mandrel 10. As the mandrel advances, webs 30 and 31 are transported past heating element 20 and ultraviolet light 22 which initiate rapid polymerization of the polymerizeable resins impregnating the webs.

Heating element 20, coacting with blower 21, is of a temperature range and size such as to raise the temperature of webs 30 and 31 through their entire thickness to a temperature of at least 170 °C. Blower 26 following heating element 20 has a shock cooling effect hardening the pipe at a faster rate to prevent deformation as it leaves mandrel 10. When Mandrel 10 is fully extended to the position depicted, motor 14 reverses direction and reverse rotation of shaft 12 by internal mechanism (not shown) causes mandrel 10 to collapse to a smaller diameter thus releasing it from webs 30 and 31. Again under control of synchronizer control 18, motor 17 reverses at high speed returning mandrel 10 to the start position from which the process is continued.

Pipe made as depicted may be formed in any number of layers as determined by the number of reels 27 and 28 and with some effect on speed for a given apparatus since the full thickness of the layers must be heated to the required temperature.

The exact mechanism of mandrel 10 is not critical to the invention and has not been illustrated. However, one contemplated form operative in the apparatus as depicted comprises a mandrel 10 made of expandable segments internally engaging camming surfaces on a portion of shaft 12 within mandrel 10 whereby when shaft rotates in a first direction the camming surfaces force the segments outwardly until reaching a locking position at which point the mandrel must turn with shaft 12. When shaft 12 is rotated in the reverse direction, the camming surfaces forceably retract the expandable segments until a second position is reached as detected by synchronizing control 18. Motor 14 may be mounted from support sleeve 11 or shaft 12 may be telescopic to allow for the reciprocating motion.

It has been found preferable to have mandrel 10 both highly reflective and resistant to adhesion. Thus the surface of mandrel 10 may be metal polished to a high finish or metal polished to a high finish and then coated with transparent polytetrafluoroethylene or similar arrangement designed to produce high reflectivity and low adherence. The highly reflective surface has been found particularly desirable with a large number of layers forming the product since it increases the heat at the inner layer and also provides a flow surface giving a finished inner product surface of glass-like characteristics best suited for flow of liquid materials as in a pipe.

Original and successful experiments in accordance with the present invention were made using "prepreg" material consisting of a woven fiberglass web impregnated with an unsaturated polyester mixture including phthalic anhydrides, fumaric and succinic acids, propylene glycol, cross linking agent and catalyst. Trialalyl cyanurate was used as a cross linking agent and azo-bisisobutyronitrile was the catalyst. The catalyst was selected for sensitivity to UV radiation. Blowers having electrical heating elements with nozzle temperatures of 538°C made by Master Appliance Corporation of Racine, Wis. were utilized. In attempts to raise the temperature of the material quickly without a flow of air under pressure, spot temperatures reached destructive levels and barrier layers formed preventing the desired rapid temperature rise in the material as a whole. Strong dense polymers were achieved.

While the invention has been described with relation to a specific embodiment, it is useful in curing similar resinous materials during short intervals of time in other arrangements and applications.

Thus it is contemplated that the invention can be used for curing polymerizeable resins whether or not they are preimpregnated in a fibrous web. It is also contemplated that the polymerizeable resin may be raised rapidly to the temperatures in accordance with the invention by infrared, rf, microwave and inductive heating. Radiation absorbent particles may be suspended in the polymerizeable resins for efficient heating by these methods.

Accordingly, it is intended to claim the invention broadly within the spirit and scope of the appended claims.

I claim:

1. Apparatus for curing polymerizeable resins impregnating a fibrous web comprising:
   a. Means to heat gas to a temperature in excess of 500°C;
   b. means to drive said gas while so heated in a directional manner;
   c. means to provide relative motion between said web and said means to drive said gas whereby said gas is directed against said web heating said web and said polymerizeable resins to a temperature of at least 170°C. over a time interval of less than one minute; and, d. means to reduce said temperature before deterioration of said web and said resins.

2. Apparatus for curing polymerizeable resins according to claim 1 further comprising means to irradiate said web with high intensity wave energy.

3. Apparatus for curing polymerizeable resins according to claim 2 in which said wave energy is electromagnetic wave energy including at least part of the ultraviolet spectrum.

4. Apparatus for curing polymerizeable resins according to claim 1 in which said means to provide relative motion is a mandrel for forming said web into the shape of an end product.

5. Apparatus for curing polymerizeable resins according to claim 4 in which said means to provide relative motion comprises means to rotate said mandrel and means to reciprocate said mandrel so as to form a continuous product.

6. Apparatus for curing polymerizeable resins according to claim 1 further comprising additional means to drive cooling gas against said web after said heating so as to rapidly cool said web.

7. Apparatus for curing polymerizeable resins according to claim 1 wherein said means to provide relative motion comprises means to transport said web past said means to drive said gas within a time interval less than one minute.

8. Apparatus for curing polymerizeable resins according to claim 7 wherein said means to transport imparts a motion to said web relative to said means to drive said gas of at least twenty feet per minute.

9. Apparatus for curing polymerizeable resins according to claim 4 further comprising an infrared reflective surface on said mandrel.

* * * * *